June 19, 1928.
A. E. SPINASSE
APPARATUS FOR DRAWING GLASS
Original Filed Oct. 16, 1915
1,674,529
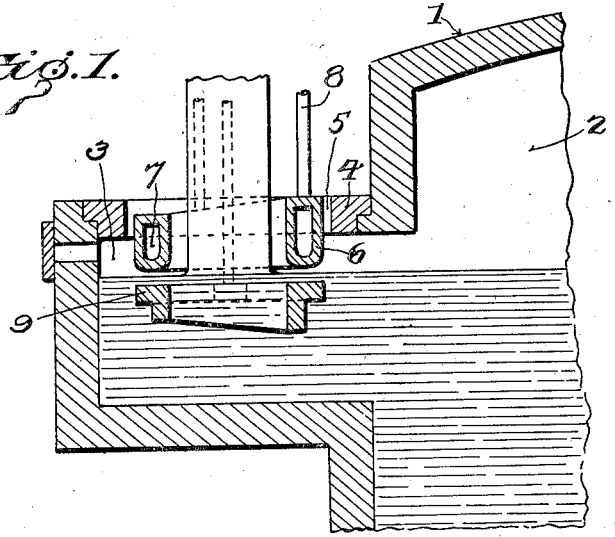
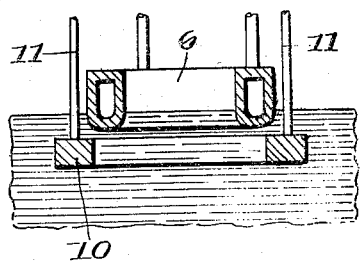
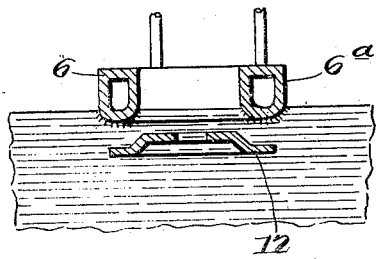
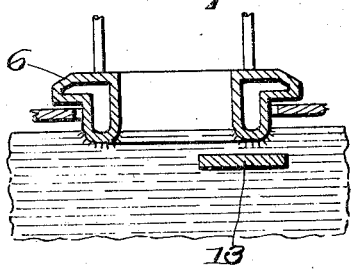
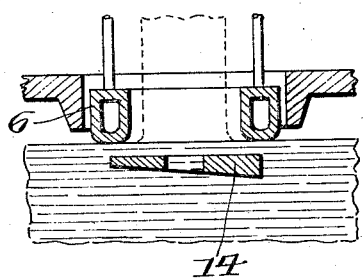
Inventor
Arthur E. Spinasse
By Sturtevant & Mason
Attorneys Patented June 19, 1928.

1,674,529

UNITED STATES PATENT OFFICE.

ARTHUR E. SPINASSE, OF MOUNT VERNON, OHIO.

APPARATUS FOR DRAWING GLASS.

Original application filed October 16, 1915, Serial No. 56,184. Divided and this application filed February 11, 1920. Serial No. 357,983.

The invention relates to new and useful improvements in glass tank furnaces, and more particularly to a glass tank furnace wherein the article is drawn from a segregated section of glass disposed at one side of the main body of molten glass.

An object of the invention is to provide means for protecting either the segregated mass of glass from which the article is drawn, or the article being drawn, or both, from the unequal temperature influence of the mass of molten glass and the furnace heat thereon.

In the drawings:—

Figure 1 is a view in section showing more or less diagrammatically a portion of a glass tank furnace having my improvements applied thereto;

Fig. 2 is a detail showing the modified shaping of the shield and the segregating ring;

Fig. 3 is a similar view but showing a further modified form of shield and segregating member;

Fig. 4 is a similar view but showing a still further modified form of shield and segregating member;

Fig. 5 is a similar view but showing a further modification of the ring and shield.

The invention broadly relates to a glass tank furnace having drawing chambers at one side thereof wherein a mass of glass is segregated so that an article may be drawn therefrom. This segregated mass of glass is at one side of the main mass of glass in the furnace.

From one aspect, the invention is directed to a shield which is wholly or in part above the surface of molten glass, and which surrounds the glass article being drawn, and this shield is so shaped as to equalize the temperature effects of the heat of the furnace on the glass article being drawn. Preferably the shield is a hollow metal shield and water cooled. Preferably also the shield is formed so that its lower edge is horizontal, and its upper edge inclined. This shield also tends to equalize the temperature effects of the heat of the furnace on the segregated molten glass from which the article is to be drawn. Preferably associated with the shield is a segregating member which likewise is so constructed as to regulate the temperature effect of the body of the molten glass on the segregated mass from which the article is drawn. In the preferred form of the invention, this segregating member is ring-shaped and its inner surface is symmetrically disposed relative to a central line and also said ring is of greater cross sectional area on the side thereof adjacent the main mass of the molten glass in the tank.

The invention will possibly be better understood by a more detail reference to the drawings. In these drawings I have shown more or less diagrammatically a glass tank furnace 1 having a main section 2 in which the body of the glass is reduced to molten condition. At one side of the main section of the furnace is a drawing chamber 3 in which the portion of molten glass is segregated, and from which segregated section the article is drawn.

In other words, the drawing area is at one side of the mass of the molten glass. The furnace is provided with a hearth 4 having an opening 5 through which the article is drawn. For a more detail disclosure of the furnace and the manner of drawing the article, reference may be made to my copending application, Serial Number 56,184, filed October 16, 1915, patented April 6, 1920, No. 1,336,056, of which this application is a division.

It will be apparent that where the segregated mass of glass from which the article is to be drawn is at one side of the main tank proper, and the main body of molten glass, the temperature effects of the heat of the furnace and the main body of glass in the tank, tends to unequally influence the temperature of the glass in the segregated mass, and also the article being drawn.

From one aspect, the invention is directed to a ring shield which surrounds the article which is being drawn at the base thereof, which shield may be either above and adjacent the surface of the glass or slightly immersed in the glass. In Figure 1 of the drawings I have shown a shield 6, which is a hollow metal shield. A chamber 7 extends throughout the entire shield and water pipes 8, 8 connected with the shield serve the double function of supplying cooling water to the chamber 7 and as a means for raising and lowering the shield through the opening in the hearth and for supporting the same. As to the means for raising and lowering the shield, reference may be had to my copending application, referred to above. This hollow metal ring shield is of greater cross sectional area on the side thereof adjacent the main part of the furnace. The chamber 7 is also shaped to conform in cross sectional area to the cross sectional area of the shield. That is, said chamber is larger in cross sectional area on the side thereof adjacent the main part of the furnace.

While I prefer to use a hollow metal shield, it will be understood from certain aspects of the invention that a refractory ring shield may be used in place thereof. The essential feature consists in the enlarged cross sectional area on the side of the ring adjacent the main part of the furnace. Through this shaping of the ring shield, the excessive temperature effects from the heat of the furnace is reduced or equalized so that the glass article being drawn is subjected substantially to equal temperature throughout. If the shield is a cooling shield, this temperature effect can be better regulated for the reason that aside from the increased area of the shield, there is an increased amount of cooling fluid, and consequently a greater cooling effect through greater radiation on that side of the article being drawn. This ring shield may be placed above the surface of the molten glass as shown in Figure 1, or may be positioned so as to engage the surface of the glass as shown in Figures 2, 3, 4 and 5. When said ring shield engages the surface of the glass it in part performs the purpose of a segregating ring and may be the sole means used for this purpose, as has been described in my co-pending application above referred to.

In Figure 1 of the drawings, the ring shield is shown with its lower edge disposed in substantially a horizontal plane and above the surface of the glass, while the upper edge thereof is in a plane inclined to the vertical. In Figure 2 of the drawings, I have shown the shield with its upper edge substantially horizontal and its lower edge in a plane inclined to the vertical. In Figure 3 of the drawings I have shown a shield wherein both the upper and lower edges are in horizontal planes, but the side 6ª of the shield 6 is extended horizontally outwardly, thus increasing the cross sectional area thereof for the purpose above described.

While, as above noted, my improved shield may be used both as a shielding element and as a segregating element, I prefer to use it as a shield as shown in Figure 1, and use in connection therewith a segregating member 9, and I also prefer to use a segregating member which is in the form of a ring. This segregating member has its inner surface symmetrically disposed relative to a vertical line passing through the center of the ring, and the wall of the segregating ring on the side adjacent the mass of molten glass or the main part of the furnace, is enlarged and preferably by extending said wall downwardly. This enlargement of the side wall of the segregating ring serves to equalize the influencing temperature effects of the mass of the molten glass in the main part of the furnace on the segregating mass of molten glass from which the article is drawn. This segregating ring member may be entirely submerged or only partly immersed in the body of molten glass. Said ring as shown in Fig. 1 is provided near its upper edge with a laterally projecting flange which serves as a means to cause the ring to assume an upright position in the molten glass when floating.

Instead of a ring shield as shown in Figure 1, I may, from certain aspects of the invention, use the ordinary segregating ring shown at 10 in Figure 2 of the drawings. Both the ring 9 and the ring 10 may be held in a predetermined position in the molten glass by means of refractory rods 11, 11, such as shown and described in my co-pending application referred to above.

Instead of the refractory ring of the form shown in Figure 2, I may use a refractory plate 12 such as shown in Figure 3, or I may use a plate 13 such as shown in Figure 4. Then again, I may use a plate 14 such as shown in Figure 5. All of these plates are adapted to be held in a predetermined position or at a desired depth in the molten glass. It will be noted that the plate 13 is disposed at the side of the ring shield adajacent the main mass of the glass and also that the plate 14 is of increased thickness on the side thereof adjacent the main mass of molten glass. By this arrangement, I am able to equalize to a certain extent the temperature effects of the mass of the molten glass on the segregated mass of the molten glass from which the article is to be drawn. The submerged plate 13 below may form an anchorage for the glass flowing thereabove, and in the drawing of sheet or plate glass, the shield or the segregating means may be oblong or rectangular in shape, or may be otherwise modified in shape for drawing articles of other desired forms and the submerged refractory member may be shaped as desired in cross-section to regulate the temperature conditions of the glass at the drawing area.

From the above it will be apparent that the invention from its broadest aspects is directed to a ring member used in connection with the drawing of a glass article, which ring member is shaped in cross section so as to provide a greater cross sectional area on the side thereof adjacent the main part of the furnace or the main mass of the molten glass, and for the purpose of equalizing the temperature effects of the furnace heat on the one hand, when said member is used as a shield, and of the main mass of molten glass on the other hand, when this member is used as a segregating member for segregating the mass of molten glass from which the article is to be drawn. From other aspects, the invention is directed to a ring shield which is water cooled and with which means is provided in the body of the molten glass for segregating the mass of glass and for regulating the temperature influences of the mass of the molten glass on said segregated mass from which the article is to be drawn. From another aspect, the invention is directed broadly to a water cooled ring shield, whether the same is wholly above the mass of the glass or slightly immersed therein, which water cooled shield has a water chamber in the side thereof adjacent the main tank, which is greater in cross section than the chamber at the opposite side thereof. In the drawings I have illustrated several ways of drawing glass articles by means of my invention, and while in these figures I have shown the drawing of a glass cylinder, it will be understood that within the broad scope of the invention, a glass sheet or other glass article may be drawn by similar means modified in form to correspond to the object being drawn, as fully stated in my parent application above referred to and of which this case is a division.

It is obvious that many changes may be made in the details of construction and the shaping of the parts without departing from the invention as set forth in the appended claims.

Having thus described the invention, what I claim as new and desire to secure by Letters-Patent, is:—

1. In a glass tank furnace having a drawing area at one side of the mass of molten glass, a shielding member disposed above and relative to the glass so that the surface of the glass is substantially unbroken, said shielding member being shaped in cross section so as to equalize the temperature effect of the body of the molten glass on the drawing area.

2. In a glass tank furnace having a drawing area at one side of the mass of molten glass, a shielding member disposed above and relative to the glass so that the surface of the glass is substantially unbroken, said shielding member being shaped in vertical cross section so as to equalize the temperature effect of the body of the molten glass on the drawing area, and means associated with said shielding member and entirely submerged in the body of molten glass and operating to regulate the temperature effect of the mass through the molten glass on the drawing area.

3. In a glass tank furnace having a drawing area at one side of the mass of molten glass, a shielding member having its inner surface substantially symmetrically disposed about the article being drawn, said shielding member being shaped in vertical cross section so as to equalize the temperature effect on the drawing area, and means for water cooling said shielding member.

4. In a glass tank furnace having a drawing area at one side of the mass of molten glass, a shielding member, said shielding member being larger in vertical cross section on the side thereof adjacent the tank, and means for water cooling said member.

5. In a glass tank furnace having a drawing area at one side of the mass of molten glass, a shield having a water cooled chamber, said shield being disposed above the surface of the molten glass, said chamber also being shaped in vertical cross section so as to equalize the temperature effect on the drawing area and a segregating means located beneath the shield and entirely submerging in the molten glass.

6. In a glass tank furnace having a drawing area at one side of the mass of molten glass, a ring shield having a water cooled chamber, said chamber being greater in vertical cross sectional area on the side thereof adjacent the mass of molten glass so as to equalize the temperature effect on the drawing area.

7. A glass tank furnace having a drawing area at one side of the mass of molten glass, a ring shield having its inner face substantially symmetrically disposed about the article being drawn, one edge of said ring shield lying in a horizontal plane and the other edge of said ring shield lying in a plane inclined to the vertical whereby said ring is provided with a greater cross sectional area on the side thereof adjacent the body of molten glass for equalizing the temperature effect on the drawing area, said ring shield being supported above the surface of the molten glass so that the surface of the glass is substantially unbroken.

8. A glass tank furnace having a drawing area at one side of the mass of molten glass, a ring shield, one edge of said ring shield lying in a horizontal plane and the other edge of said ring shield lying in a plane inclined to the vertical whereby said ring shield is provided with a greater cross sectional area on the side adjacent the mass of molten glass for equalizing the temperature effect on the drawing area, said ring shield having a water cooled chamber.

9. A glass tank furnace having a drawing area at one side of the mass of molten glass, a ring shield, one edge of said ring shield lying in a horizontal plane and the other edge of said ring shield lying in a plane inclined to the vertical whereby said ring shield is provided with a greater vertical cross sectional area on the side adjacent the main mass of molten glass for equalizing the temperature effect on the drawing area, said ring shield having a water cooled chamber, said chamber conforming to the cross sectional area of the ring shield.

10. In a glass tank furnace having a drawing area at one side of the mass of molten glass, a ring shield having a water cooled chamber extending throughout the ring shield, said chamber being of greater cross sectional area on the side of the ring shield adjacent the body of bolten glass, water pipes for circulating water through said chamber, said water pipes being connected to said ring shield and serving as a means for raising and lowering the same.

11. In a glass tank furnace having a drawing area, a shielding means surrounding the drawing area in a region directly above the surface of the glass, and means associated with said ring shield and entirely submerged in the body of molten glass so as to equalize the temperature effect of the body of molten glass in the tank on the mass of glass from which the article is to be drawn.

12. In a glass tank furnace having a drawing area at one side of the mass of molten glass, a water cooled ring shield surrounding the drawing area in the region directly above the glass, and a refractory ring submerged in the body of molten glass, said refractory ring being greater in vertical cross sectional area on the side thereof adjacent the body of molten glass.

13. In a glass tank furnace having a drawing area at one side of the mass of molten glass, a water cooled ring shield surrounding the drawing area in the region directly above the glass, and a refractory ring submerged in the body of molten glass, said refractory ring being greater in vertical cross sectional area on the side thereof adjacent the body of molten glass, the upper edge of said refractory ring lying in a horizontal plane and the lower edge of said refractory ring lying in a plane inclined to the vertical.

14. In a glass tank furnace having a drawing area at one side of the mass of molten glass, a refractory ring, the upper edge of said ring being horizontal and the lower edge of said ring being inclined to the vertical whereby the side of the ring adjacent the body of molten glass is extended downwardly, said ring being so disposed in the mass of molten glass that the surface of the glass is substantially unbroken thereby.

15. In a glass tank furnace having a drawing area at one side of mass of molten glass, a ring of refractory material, said refractory ring being entirely submerged in the molten glass, the upper edge of said ring lying in a horizontal plane and having an outwardly extending flange, the lower edge of said ring being in a plane inclined to the vertical whereby the side of the ring adjacent the body of molten glass is extended downwardly so as to equalize the temperature effect on the drawing area.

16. A glass tank furnace having a drawing area at one side of the mass of molten glass, a hollow metal ring shield adapted to surround the glass article at the base thereof, said hollow metal ring shield being of larger cross sectional area on the side thereof adjacent the main mass of molten glass in the furnace.

17. In a glass tank furnace having a drawing area at one side of the mass of molten glass, a hollow metal ring shield, means for circulating water therethrough, said hollow metal ring shield being larger in vertical cross section on the side thereof adjacent the mass of molten glass.

18. In a glass tank furnace having a drawing area at one side of the mass of molten glass, a hollow metal ring shield, said ring shield being larger in vertical cross section on the side thereof adjacent the mass of molten glass, the chamber within said shield being likewise larger in cross sectional area on the side thereof adjacent the mass of molten glass, and means for circulating cooling water through said shield.

19. In a glass tank furnace having a drawing area at one side of the mass of molten glass, a hollow metal ring shield having the side thereof adjacent the mass of molten glass larger in vertical cross section, means for circulating water through said shield, a refractory segregating ring disposed beneath said shield in the molten glass, and means for holding said refractory ring in fixed position.

20. In an apparatus for drawing glass articles from a bath of molten glass in a furnace, a segregating means maintained with its upper edge substantially entirely submerged beneath the surface of the glass whereby the surface of the glass is unbroken by said segregating means, said segregating means progressively increasing in cross section toward the hotter portion of the molten glass in the bath so as to control the temperature effect of the mass of molten glass on the glass at the drawing area.

21. In apparatus for drawing glass cylinders, sheets or like articles from molten glass, a receptacle for containing a bath of molten glass from which to draw the article, a refractory means disposed in submerged position with its upper portion lying below the surface of the bath adjacent the base of the drawn article so as to provide a layer of cooler glass thereabove from which to draw the article, said refractory means being shaped in cross section so as to create varying cooling effects at different places upon the glass of the bath adjacent the source of the drawn article.

22. In apparatus for drawing glass cylinders, sheets or like articles from molten glass, a receptacle for containing a bath of molten glass from which to draw the article, a refractory means disposed in submerged position with its upper portion lying below the surface of the bath adjacent the base of the drawn article so as to provide a layer of cooler glass thereabove from which to draw the article, said refractory means having its lower portion extending to greater depths in the hotter portions of the bath to compensate for varying drawing temperature conditions in the layer of cooler glass adjacent the source of the drawn article.

23. In apparatus for drawing glass cylinders, sheets or like articles from a bath of molten glass in a furnace, a refractory body disposed within the bath with its upper surface in spaced relation below the surface of the bath adjacent the drawing area to partially cool a layer of glass from which to draw the article, and shielding means for the drawn article associated with said refractory body and disposed with its lower portion lying spaced above the surface of the bath to leave substantially free the surface of the bath between said refractory body and shielding means, said refractory body and shielding means being shaped in cross section to compensate for varying drawing conditions in the bath and forming walls of the drawn article.

24. In apparatus for drawing glass cylinders, sheets or like articles from a bath of molten glass in a furnace, a refractory body disposed within the bath with its upper surface in spaced relation below the surface of the bath adjacent the drawing area to partially cool a layer of glass from which to draw the article, and shielding means for the drawn article associated with said refractory body and disposed with its lower portion lying spaced above the surface of the bath to leave substantially free the surface of the bath between said refractory body and shielding means, said refractory body having portions extending in the glass bath at different distances at different places, the portions of said refractory body extending to greater distances in the bath being in the hotter portions of the bath to regulate drawing temperature conditions in the glass of the bath adjacent the source of the drawn article.

25. In apparatus for drawing glass articles, a furnace for holding a bath of molten glass, a segregating member in the bath adjacent the source of generation of the drawn article, said segregating member being entirely submerged and having portions projecting at different levels at different places in the bath, and a shield for the drawn article independent from said segregating member, said shield having its lower edge in spaced relation above the glass bath.

26. In apparatus for drawing glass cylinders, sheets or like articles from a bath of molten glass, a refractory body disposed with its upper portion submerged in spaced relation beneath the surface of the bath adjacent the base of the drawn article, said refractory body being irregular in shape to produce a layer of cooler glass thereabove at predetermined desired drawing temperature.

27. In apparatus for drawing glass cylinders, sheets or like articles from a bath of molten glass, a refractory body disposed with its upper portion submerged in spaced relation beneath the surface of the bath adjacent the source of the drawn article the lower portion of said refractory body extending to different depths at different places to compensate for varying drawing conditions at the drawing area.

28. In apparatus for drawing cylinders, sheets or like articles from a bath of molten glass, a shielding member disposed above and relative to the glass so that the surface of the glass therebeneath is substantially unbroken, and means associated with said shielding member submerged in the bath with its upper portion in spaced relation beneath the base of the drawn article, said means being shaped in cross section so as to control the temperature effect of the mass of molten glass at the drawing area.

29. In apparatus for drawing glass cylinders, sheets or like articles from a bath of molten glass, a refractory body for segregating a top layer of cooler glass in the bath from which to draw the article, said refractory body being located with its upper portion submerged in the bath in spaced relation beneath the base of the drawn article, said refractory body being greater in vertical cross section in the hotter portions of the glass bath.

30. In the art of drawing glass cylinders, sheets or like articles from a bath of molten glass, the method of segregating a portion of cooler glass in the bath from which to draw the article by maintaining a refractory body with its upper portion submerged beneath the surface of the bath adjacent the base of the drawn article so that the surface of the bath at the drawing area and in proximity thereto is substantially free and unobstructed during drawing, and cooling the segregated portion of the glass more strongly at one place than another in desired degrees at predetermined places and with said refractory body during drawing.

31. In the art of drawing glass cylinders, sheets or like articles from a bath of molten glass, the method of segregating a portion of cooler glass in the bath from which to draw the article, by causing glass from the bath to pass from different levels at different places to the drawing area to compensate for varying temperature conditions at the drawing area while maintaining the segregating means submerged within the bath and the surface of the bath thereabove substantially free and unobstructed during drawing.

32. In apparatus for drawing glass articles, a holder for a bath of molten glass, a segregating device, means for holding said device submerged within the bath in spaced relation below the surface level of the bath to segregate a layer of slightly cooler glass from which to draw the article, said device being shaped so as to compensate for variation in temperature in said layer of glass.

33. In apparatus for drawing glass articles, a holder for a bath of molten glass, a segregating device, means for holding said device submerged within the bath in spaced relation below the surface level of the bath to segregate a layer of slightly cooler glass from which to draw the article, said device being shaped so as to compensate for variation in temperature in said layer of glass, shielding means for said layer of glass, and means for supporting said shielding means with the lower portion thereof spaced just above the surface level of the bath so that the surface of the bath beneath said shielding means will be substantially free and unbroken during drawing.

34. In apparatus for drawing glass cylinders, sheets and like articles from a bath of molten glass, a segregating device having a configuration corresponding substantially to that of the base of the article to be drawn, and having a continuous and enclosing body for the glass beneath the base of the article being drawn, and means for holding said device submerged within the bath to provide a segregated surface layer of the molten glass from which the article may be drawn, said segregating device lying beneath and coextensive with the base of the article being drawn and further having a contour formed to regulate the drawing temperature in said layer of glass.

35. The process of drawing glass cylinders, sheets and other articles from a bath of molten glass, which consists in drawing the article from the surface of the bath with the opposite side faces of the article at its source remote from any cooling refractory walls intersecting the surface of the bath, and maintaining a refractory temperature controlling and anchoring element submerged within the bath adjacent the base of the article being drawn.

36. The process of drawing glass cylinders, sheets and other articles from a bath of molten glass, which consists in wholly submerging a glass segregating and temperature control element within the bath slightly below the surface of the bath, while maintaining the surface of the bath extending over and above the entire area of said wholly submerged element substantially free and unbroken during drawing.

In testimony whereof, I affix my signature.

ARTHUR E. SPINASSE.